United States Patent [19]

Ichikawa et al.

[11] Patent Number: 4,702,669

[45] Date of Patent: Oct. 27, 1987

[54] MECHANISM FOR TRANSFERRING CURED TIRES FROM TIRE PRESS TO POST-INFLATOR

[75] Inventors: Katsumi Ichikawa, Akashi; Masahide Kanzawa, Kobe, both of Japan

[73] Assignee: Kabushiki Kaisha Kobe Seiko Sho, Kobe, Japan

[21] Appl. No.: 791,079

[22] Filed: Oct. 24, 1985

[51] Int. Cl.$^4$ .............................................. B65G 47/76
[52] U.S. Cl. ................................. 414/749; 425/28 P; 425/38
[58] Field of Search ............................... 414/749, 750; 198/468.6, 614; 425/28 P, 29, 38

[56] References Cited

U.S. PATENT DOCUMENTS

| | | | |
|---|---|---|---|
| 3,001,334 | 9/1961 | Giusti et al. | 425/28 P X |
| 3,008,180 | 11/1961 | Woodhall | 425/38 |
| 3,128,579 | 4/1964 | Kehoe et al. | 425/28 P X |
| 3,196,066 | 7/1965 | Hollis | 414/749 X |
| 3,343,208 | 9/1967 | Pacciarini et al. | 425/38 |
| 3,375,941 | 4/1968 | Repper, Jr. | 198/468.6 X |
| 3,483,596 | 12/1969 | Ulm | 425/29 |
| 3,753,489 | 8/1973 | Tomioka et al. | 414/750 X |
| 3,826,347 | 7/1974 | Kornylak | 198/614 |
| 4,092,090 | 5/1978 | Yuhas et al. | 425/28 P |
| 4,169,698 | 10/1979 | Turk et al. | 425/28 P |
| 4,170,442 | 10/1979 | Singh | 425/38 |
| 4,360,096 | 11/1982 | Rocco et al. | 425/28 P X |
| 4,385,027 | 5/1983 | Nakagawa et al. | 425/38 X |
| 4,427,332 | 1/1984 | Manriquez | 414/750 X |
| 4,573,859 | 3/1986 | Amano et al. | 414/589 X |

FOREIGN PATENT DOCUMENTS

| | | | |
|---|---|---|---|
| 5753 | 1/1981 | Japan | 425/28 P |
| 20444 | 2/1982 | Japan | 414/749 |
| 57-140144 | 8/1982 | Japan | . |

Primary Examiner—Leslie J. Paperner
Assistant Examiner—P. McCoy Smith
Attorney, Agent, or Firm—Oblon, Fisher, Spivak, McClelland & Maier

[57] ABSTRACT

A mechanism for transferring cured tires from a tire press to a post-inflator, which includes a plurality of ejector arms located between the tire press and post-inflator and movable horizontally toward and away from the tire press and vertically up and down in a receded position outside the tire press, and receiver arms supported on the post-inflator and horizontally movable back and forth in parallel relationship with and at a level vertically spaced from the ejector arms, the receiver arms being spaced from each other by a predetermined distance to permit passage of the ejector arms and a lower rim of the post-inflator vertically therethrough.

4 Claims, 14 Drawing Figures

MECHANISM FOR TRANSFERRING CURED TIRES FROM TIRE PRESS TO POST-INFLATOR

BACKGROUND OF THE INVENTION

1. Field of the Invention

This invention relates to improvements in the mechanism for transferring cured tires from a tire press to a post-inflator which is located behind the tire press.

2. Description of the Prior Art

As well known in the art, various kinds of tires are cured to shape by means of a tire press which is mainly consituted by upper and lower molds which are closable one on the other, and a bladder which is retained on a center mechanism at the center of the upper and lower molds and which is inflatable by introduction of a hot pressure medium. Cured tires are successively transferred to a post-inflator which is located behind the tire press for inflation treatment. The conventional transfer mechanisms for conveying the cured tires from a tire press to a post-inflator generally consist of means for scooping up a cured tire, which is lifted up from the lower mold by the center mechanism, by a tire unloader, ejecting the tire in a tilted posture onto a gravity roller conveyer to advance the tire along the conveyer by gravity of for moving the ejected tire along a roller conveyer which is positively rotated by a drive means. In any event, it has been the usual practice to employ a roller conveyer for the transfer of cured tires. In the former case, namely, in the transfer of tires by a gravity roller conveyer, the tires have encountered various problems before reaching the post-inflator, for example, sideward deviations, hang-up in the middle of the transfer path, damages etc. In addition, it is necessary to provide a stopper on the part of the post-inflator to stop the delivered tires correctly in a predetermined position since otherwise there will occur the so-called rim biting effect which is detrimental to the quality of the products. On the other hand, in the latter case, namely, in the tire transfer by a driven roller conveyer, it is essential to provide a position detecting control means such as a limit switch or photoelectric tube for stopping the tires in a predetermined position. However, the position detecting means of this sort requires a complicated adjustment each time the size of the tires is to be changed, in addition to the provision of a tire centering mechanism, resulting in a complicated mechanism and in inviting rim biting more frequently due to centering failures.

SUMMARY OF THE INVENTION

It is an object of the present invention to provide an improved tire transfer mechanism which can eliminate the above-mentioned problems or drawbacks of the conventional roller conveyer type tire transfer mechanisms.

It is a more particular object of the invention to provide a tire transfer mechanism which is arranged to eject a cured tire from a tire press by simple linear movements of horizontally reciprocable and vertically movable tire ejector arms, and to receive and transfer the ejected tire to a lower rim set position of the post-inflator by horizontally reciprocable receiver arms, thereby restricting free movements of the cured tire to hold the same in a dead state for transfer exactly to the predetermined position on the post-inflator.

According to the invention, the above-mentioned objective is achieved by the provision of a transfer mechanism which essentially comprises: a pair of ejector arms located at a median point between the tire press and a post-inflator and which is movable horizontally toward and away from the tire press and vertically up and down at a receded position outside the tire press; and a pair of receiver arms retained on the post-inflator and movable horizontally back and forth in parallel relation with and at a level vertically spaced from the ejector arms, the receiver arms being horizontally spaced from each other by a predetermined distance to permit passage of the ejector arms and a lower rim of the post-inflator vertically therethrough.

The above and other objects, features and advantages of the invention will become apparent from the following description and the appended claims, taken in conjunction with the accompanying drawings which show by way of example some preferred embodiments of the invention.

DESCRIPTION OF PREFERRED EMBODIMENTS

Figure 1:
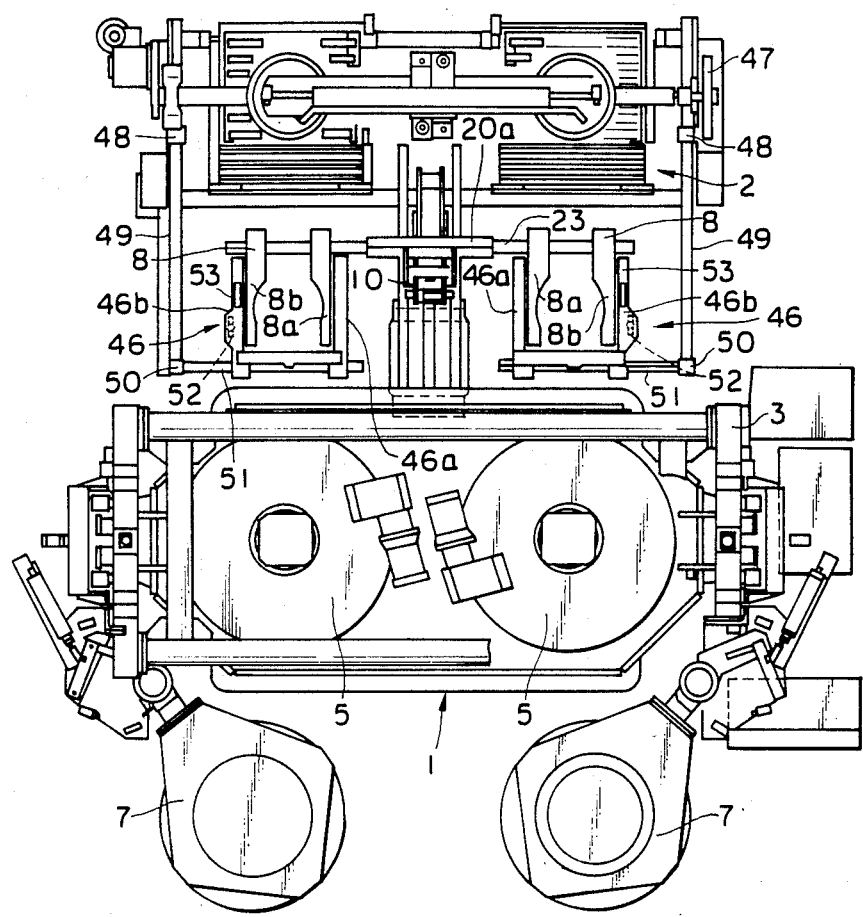
FIG. 1 is a schematic plan view of a tire press and a post-inflator incorporating a transfer mechanism according to the invention.
Figure 2:
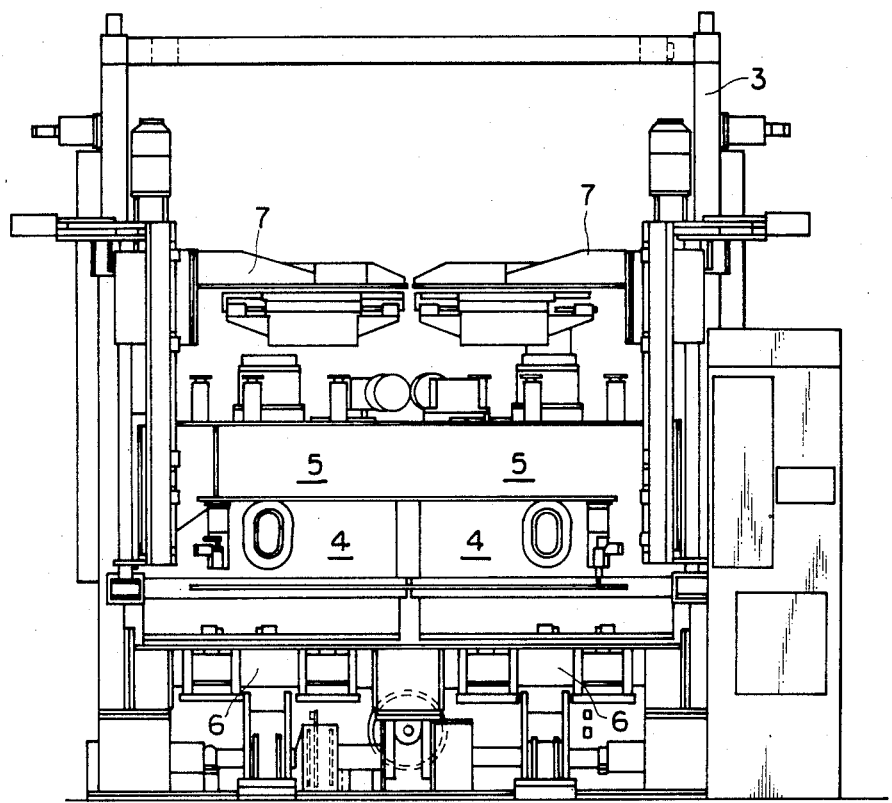
FIG. 2 is a front view of the tire press and post-inflator of FIG. 1.
Figure 3:
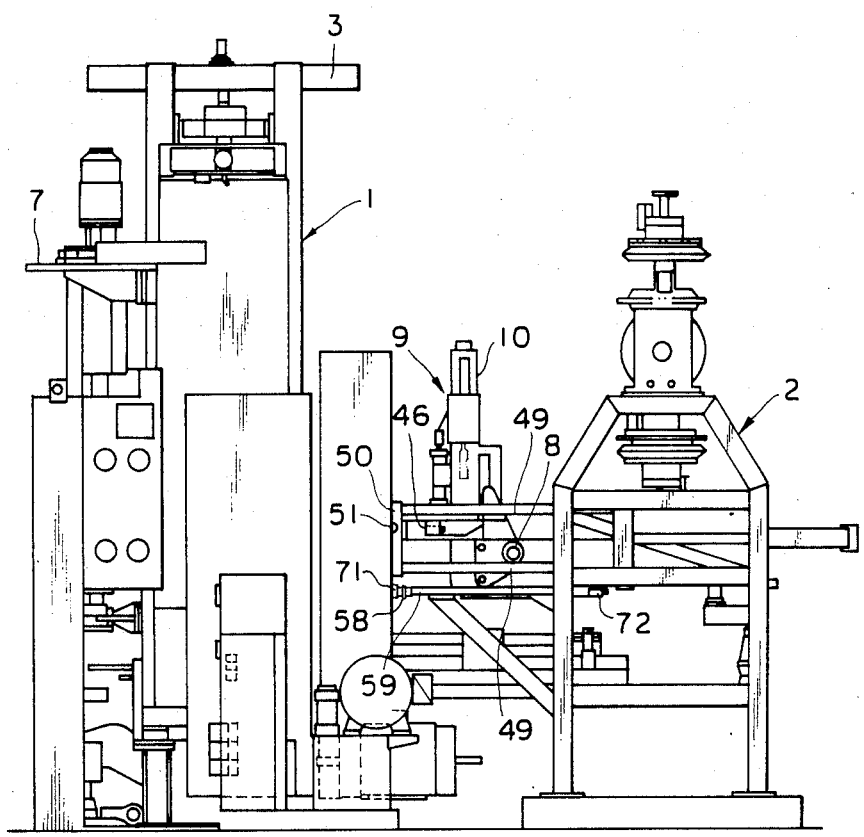
FIG. 3 is a side view of the tire press and post-inflator.

Hereafter, the invention is described more particularly by way of the preferred embodiments shown in the drawings. Referring first to FIGS. 1 to 3, there is shown an example of application of the tire transfer mechanism of the invention to a twin type tire press. In this case, a post-inflator 2 is located behind a tire press 1 in a parallel fashion. The tires which have been cured to shape by the tire press 1 are ejected from the press 1 and transferred to the post-inflator 2. These tire press 1 and post-inflator 2 are of known construction so that their details are omitted in the following description. As is well known in the art, each section of the tire press 1 mainly consists of a lower mold 4 which is fixedly mounted on a base of a press frame 3, an upper mold 5 which is, in the particular example shown, vertically movably mounted on a frame 3, and a center mechanism 6 which is mounted on the base vertically movably at the center of the lower mold (at the press center) and provided with a bladder of rubber or other resilient material which is resiliently inflatable for contact with the inner wall surface of a green tire. Although FIGS. 1 to 3 show a twin type tire press with two sets of molds 4 and 5 side by side on the frame 3, the present invention is also applicable to single type tire presses with only one set of molds or to other multiple type tire presses with more than two sets of molds. In such tire presses, after retracting the upper mold 5 upward, a green tire is delivered to and set on the open lower mold 4 by means of a swingable tire loader 7 in a manner well known in the art. At this time, the bladder of the center mechanism 6 is retained in a vertically stretched cylindrical form. In the next place, the upper mold 5 in the upper reduced position is lowered and closed on the lower mold 4. In the course of the downward movement, the upper mold 5 comes into engagement with and takes therewith an upper clamp ring which holds the upper end of the bladder. As a result, the bladder is resiliently inflated to contact the inner wall surface of the green tire with the aid of a hot pressure medium such as steam or the like which is introduced into the bladder through the center mechanism 6, thereby initiating the step of shaping the inner wall surface of the tire. Simultaneously, the upper mold 5 and lower mold 4 are closed and clamped relative to each other, and heated by hot plates which are built into the respective molds, while a hot pressure medium is admitted into a dome which encloses the upper and lower molds 5 and 4, to thereby cure the green tire to shape under pressure. Upon completion of the curing operation, the mold clamp is released and the upper mold 5 is raised to the upper retracted position. Thereafter, the center mechanism 6 is raised to lift up the cured tire from the lower mold 4 through the bladder. The tire in the lifted position is supported on its lower side by a tire unloader which is advanced from outside of the tire press, while the upper clamp ring which supports the upper end of the bladder of the center mechanism 6 is solely raised, pulling the bladder off the inner surface of the tire and stretching the same vertically into a cylindrical shape. Accordingly, upon raising the tire unloader, the tire is lifted up clear of the bladder, and then such is dropped onto an inclined gravity roller conveyer or a rotationally driven roller conveyer as mentioned hereinbefore for transfer to the post-inflator 2 for the inflation treatment.

The transfer mechanism of the invention is located at a median position between the tire press and post-inflator 2 as described above for transferring the cured tires from the former to the latter. As exemplified in FIGS. 1 and 3, the transfer mechanism includes ejector arms 8 for ejecting cured tires from the tire press 1, the ejector arms 8 each being horizontally reciprocable toward and away from the respective mold center of the press and vertically movable at the mold center and at a receded position outside the tire press. The tires which have been picked up on the ejector arms 8 are received and securely transferred to the post-inflator 2 in a stable manner by receiver arms 46 which are supported on the post-inflator 2, the receiver arms 46 each being horizontally movable in parallel relation with the opposing ejector arms 8 to a lower rim setting position on the post-inflator 2. The following description deals with the details in construction of the arms 8 and 46 which are employed in the particular embodiment shown.

Figure 4:
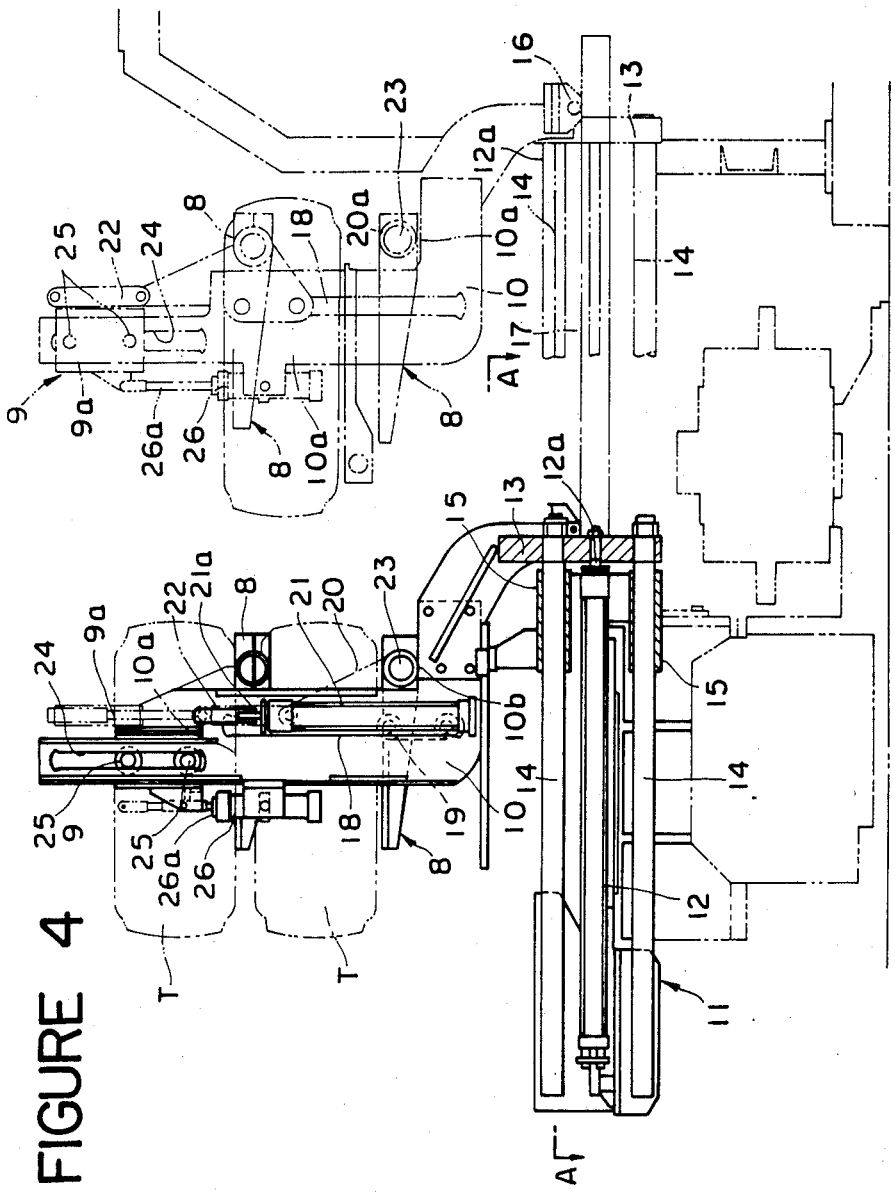
FIG. 4 is a side view of ejector arms.
Figure 5:
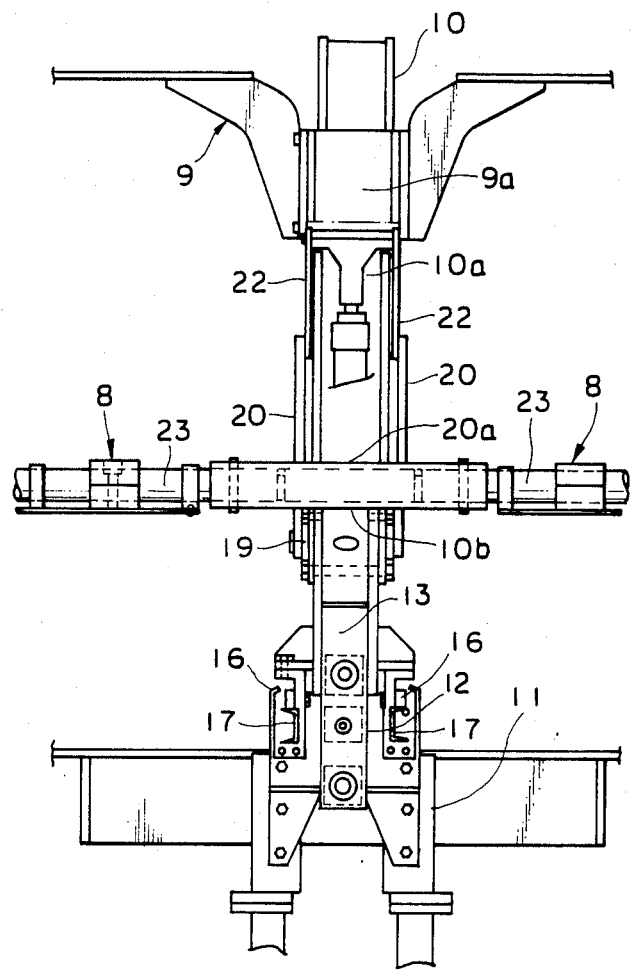
FIG. 5 is a front view of the ejecting arms, showing major components thereof.
Figure 6:
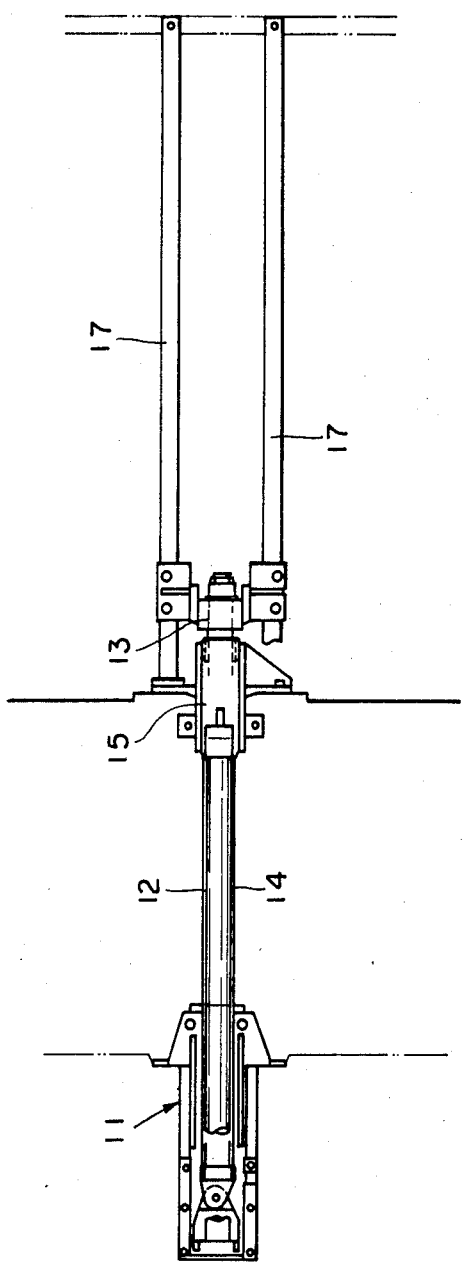
FIG. 6 is a sectional view taken along line A—A of FIG. 4.

Referring to FIGS. 4 to 6, a bracket 10 which supports the ejector arms 8 is connected through a link member 13 to a piston rod 12a of a drive cylinder 12 (operated by hydraulic or other fluid pressure) which is mounted on a fixed beam 11, for movement toward and away from the tire press 1. In this instance, the link member 13 is provided with a plurality of guide shafts, for example, a pair of upper and lower guide shafts 14 which are slidably fitted in guide sleeves 15 provided on part of the fixed frame 11. Provided on the opposite sides of the link member 13 are guide rollers 16 which are movable on and along guide rails 17 on the fixed frame 11 to serve as auxiliary means for appropriately moving the bracket 10 straight in the horizontal direction without deflections in the vertical or lateral directions. The bracket 10 is provided with a vertical guide slot 18 in a lower portion of its upright mounting portion 10a, slidably receiving therein a guide roller 19 of a vertically movable shaft support 20 which is connected through a link 22 to a piston rod 21a of a drive cylinder 21 (operated by hydraulic or other fluid pressure) which is in turn mounted on the mounting portion 10a. A horizontal sleeve 20a is provided on part of the shaft support 20 perpendicularly to the mounting portion 10a, and a retainer shaft 23 is nonrotatably fixed in the sleeve 20a. A pair of arms 8a and 8b which constitute the afore-mentioned ejector arms are fixably and parallelly mounted on the retainer shaft 23 and are adjustable with respect to the distance from each other depending upon the size of the tires to be handled. In this instance, as shown in FIGS. 4 and 5, the sleeve 20a is abuttingly supported by the horizontal support portion 10b of the bracket 10 in the lowermost portion of the shaft support 20. In thse figures, the ejector arms 8 in advanced positions are indicated by solid lines on the left side and the ejector arms in the receded positions are indicated by chain line on the right side. The upper and lower ejector arms 8 in the advanced and receded positions imply that they are vertically movable at the respective positions.

Figure 7:
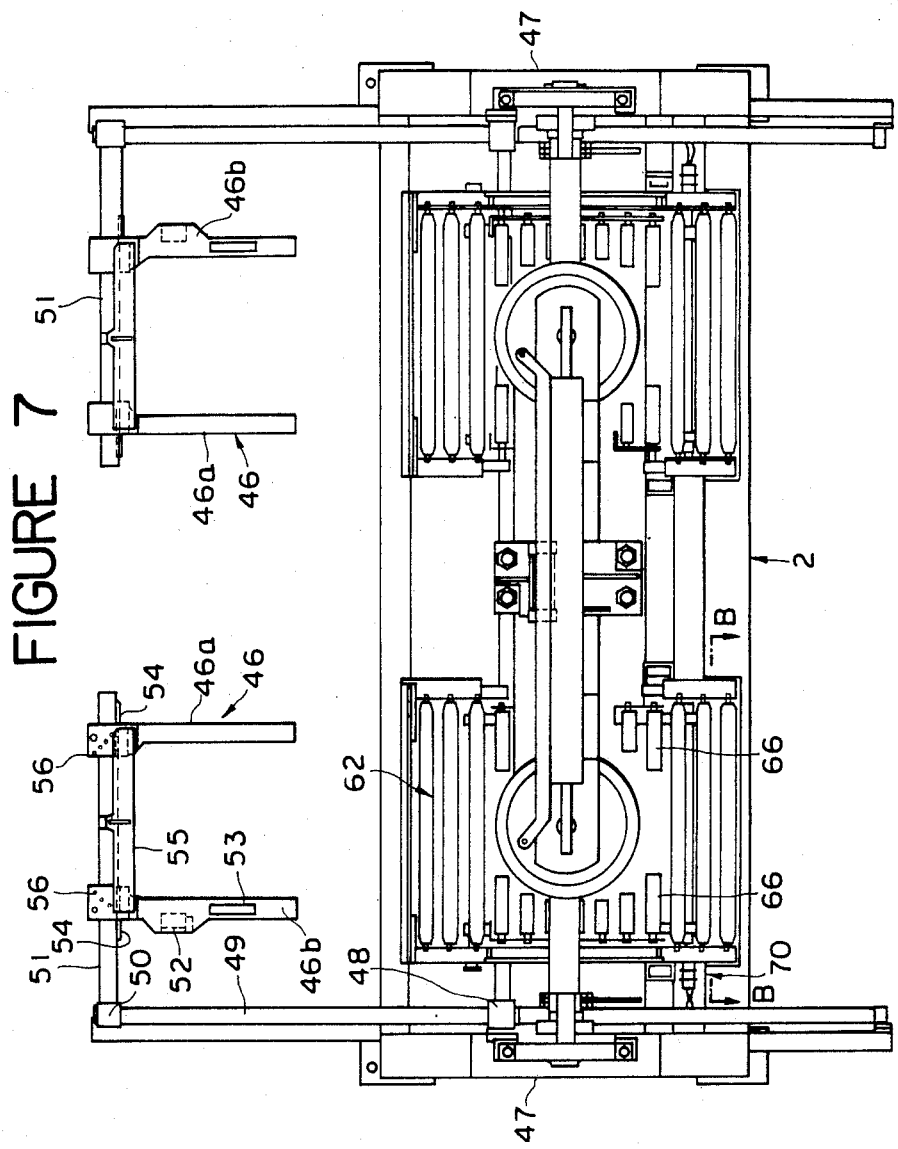
FIG. 7 is a plan view of receiver arms of the present invention.
Figure 8:
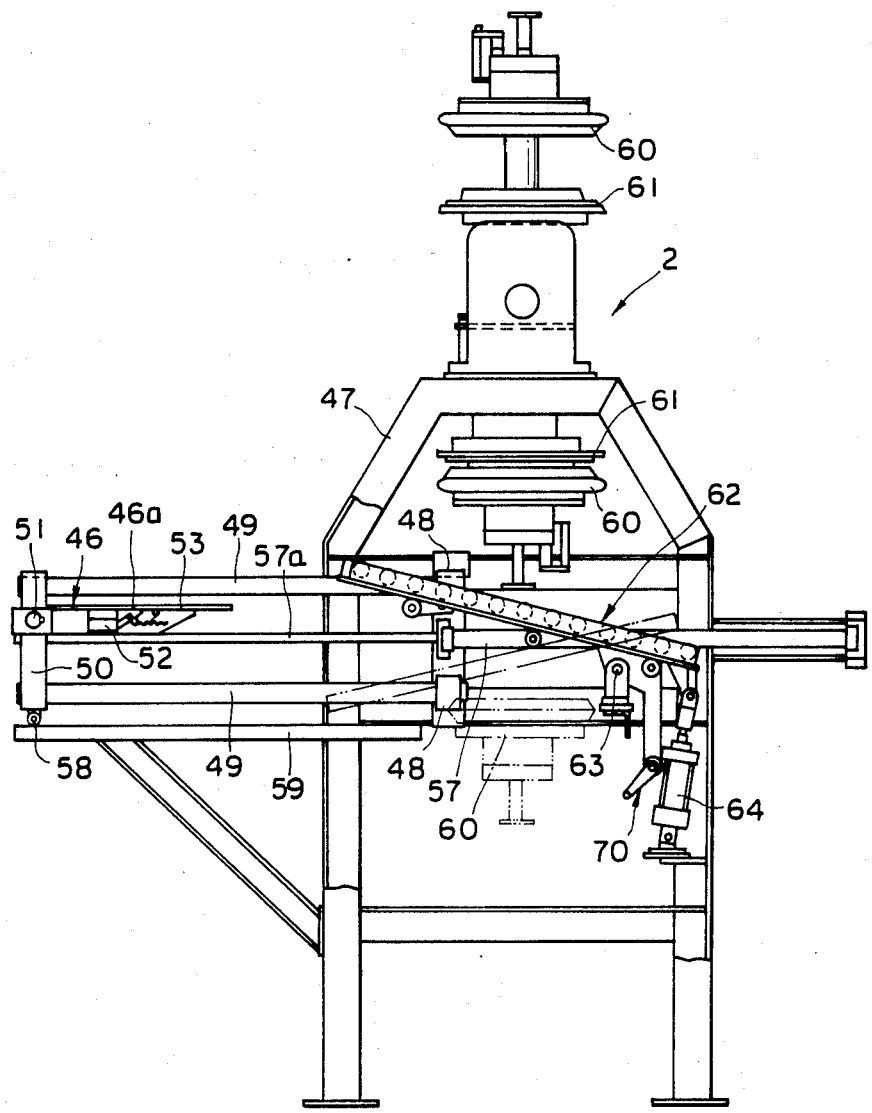
FIG. 8 is a side view of the receiver arms.
Figure 9:
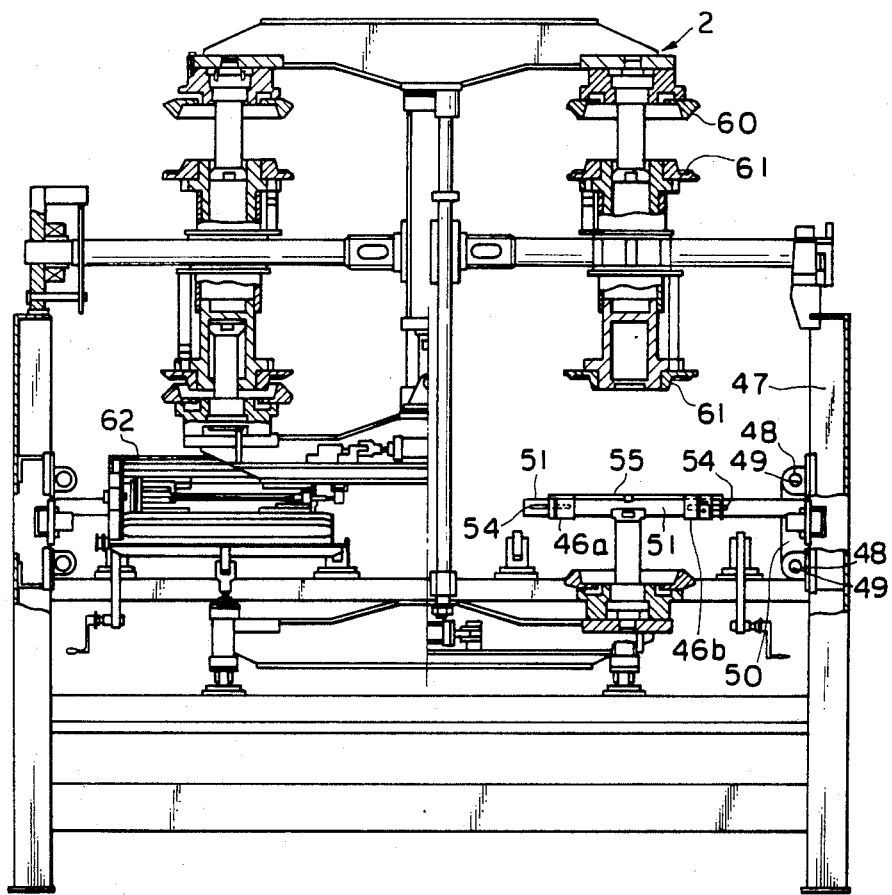
FIG. 9 is a front view of the receiver arms.

On the other hand, as illustrated in FIGS. 7 to 9, the receiver arms 46 are constituted by a pair of arms 46a and 46b which are fixably mounted on a support shaft 51 and which are adjustable with respect to a a predetermined space from each other depending upon the tire size. The support shaft 51 is supported in the fashion of a cantilever on a block 50 which bridging the fore ends of guide shafts 49. These guide shafts 49 are slidably fitted in guide sleeves 48 which are fixedly mounted on a frame 47 of the post-inflator 2. The space between the arms 46a and 46b is determined such that the ejector arms 8a and 8b are passable therethrough perpendicularly in the vertical direction as shown in FIG. 1 and such that the lower rim of the post-inflator 2 is passable therethrough also perpendicularly in the vertical direction as will be described hereinbelow. A detecting member 52 and an actuating member of a limit switch or the like is associated with one receiver arm 46b to confirm reception of a tire. Indicated at 54 is a parallel key for blocking rotation of the arms 46a and 46b, at 55 is a spacer plate for the arms 46a and 46b, and at 56 are adjusting holes formed in the respective arms for adjustably fixing the same to the spacer plate 55. In this regard, it is possible to employ an arbitrary construction for adjustably fixing the arms 46a and 46b in place of the above-described arrangement.

The block 50 is connected to a piston rod 57a of a drive cylinder 57 which is mounted on the part of the post-inflator 2, so that the receiver arms 46 are horizontally reciprocable. In a case where a hydraulic cylinder is used for the drive cylinder 57, it is possible to control forward and backward strokes precisely. The receiver arms 46 can be moved correctly in the horizontal direction along with the guide shafts 49 in the guide sleeves 48 by providing a guide roller 58 on the block 50, the guide roller 58 being movable on and along a guide rail 59 which is mounted on the frame 47.

Figure 10:
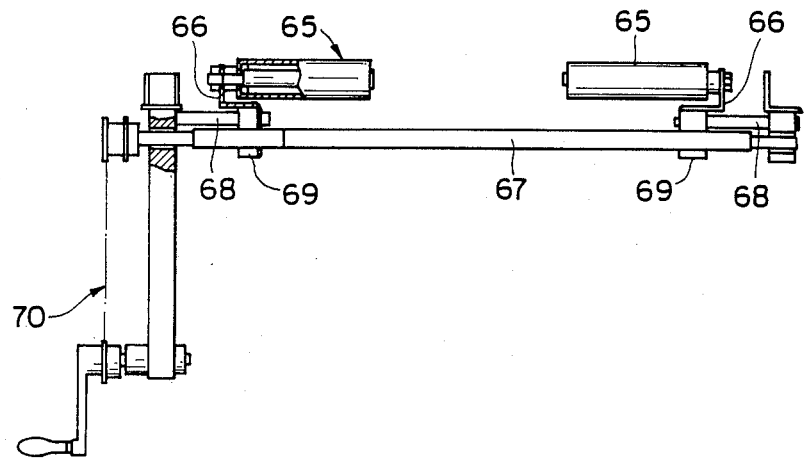
FIG. 10 is a sectional view (taken along line B—B of FIG. 7) of a discharging roller conveyer, showing major components thereof.

The post-inflator 2 itself is of a known construction and therefore its details are omitted in the following description for simplicity of explanation. In the particular example shown, such is of a rotary duplex type including lower and upper rims 60 and 61 and sloped gravity conveyers 62 for discharging the tires out of the inflator after the inflation treatment. In this case, the conveyers 62 are gravity roller conveyers each having one end thereof pivotally supported by a pivot shaft 63 and connected to a drive cylinder 64 so as to be swingable in the upward and downward directions. As seen in FIG. 7, of the conveyer rollers which are arranged in a row, the rollers which support the tire opening edge are shortened in length to permit passage therethrough of the lower rim 60, and, the groups of short rollers 65 which are set apart as shown in FIGS. 7 and 10 commonly supported by frames 66 separately from the conveyer frame. To cope with changes in the tire size, the support frames 66 are reciprocably retained on a common screw shaft 67 (with screw threads of opposite directions) which is rotatable in both forward and reverse directions, through screw nuts 69 which are restricted by guide bars 68. Indicated at 70 is a drive unit for rotating the screw shaft 67 in forward and reverse directions.

According to the present invention, cured tires are transferred from the tire press 1 to the post-inflator 2 by the ejector and receiver arms 8 and 46 in the following manner.

Figure 11A:
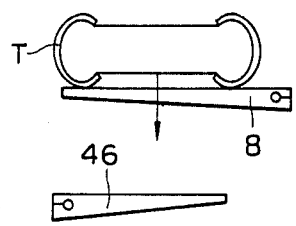
FIGS. 11A to 11D are schematic views explanatory of the sequential operations by the transfer mechanism.
Figure 11B:
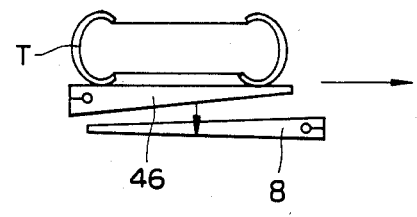
Figure 11C:
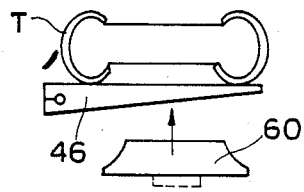
Figure 11D:
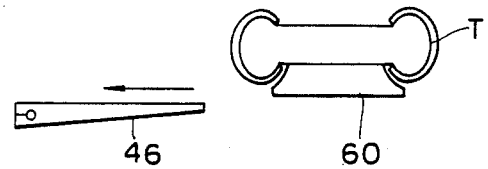

Shown in FIG. 1 is a phase in which a green tire is cured on the tire press 1 and the ejector and receiver arms 8 and 46 are in the respective initial or starting positions. Since the bracket 10 is held in the receded position by the drive cylinder 12, the ejector arms 8 are retained in receded positions at a median point between the tire press 1 and the post-inflator 2. On the other hand, as the piston rod 57a of the drive cylinder 57 on the post-inflator 2 is in the advanced position, the receiver arms 46 are retained in the advanced position shown. The receiver arms 46 are located at a higher level than the ejector arms 8 as shown in FIG. 3 so that there occurs no interference therebetween. As soon as the upper mold 5 is opened and lifted up into the receded position upon completion of the curing operation in the manner well known in the art, the cured tire on the lower mold 4 is disengaged from the latter and lifted up by an upward movement of the center mechanism 6. Thereupon, the ejector arms 8 are horizontally advanced by the drive cylinder 12 through the bracket 10 to protrude the arms 8a and 8b under the cured tire in the lifted position, while the bladder of the center mechanism 6 is disengaged from the inner surface of the wire and vertically stretched into a cylindrical form by upward movement of the piston rod in a manner well known in the art. As the center mechanism 6 is lowered as a whole, the ejector arms 8 are moved upward along the guide slot 18 of the bracket 10 by operation of the drive cylinder 20 to lift up the cured tire clear of the bladder. In the next phase of the operation, the bracket 10 is moved backward by the drive cylinder 12, taking therewith the ejector arms 8 to a position outside the tire press 1 to eject the cured tire as shown in FIG. 11A. The ejector arms 8 which are receded in the lifted state are located at a higher level than the receiver arms 46 which are stopped in the advanced positions. (FIG. 4) Accordingly, upon lowering the ejector arms 8 in the receded position vertically to the initial level by the drive cylinder 20, they are passed through the space between the reveiver arms 46a and 46b, and the cured tire T on the arms 8a and 8b is transferred to the receiver arms 46a and 46b as shown in FIG. 11B. The lowered ejector arms 8 are now stopped in the initial position. The receipt of the cured tire T is confirmed by the actuator 53 and the detecting member 52 which are provided in association with one receiver arm 46b as mentioned hereinbefore, whereupon the piston rod 57a of the drive cylinder 57 on the post-inflator 2 is retracted, horizontally receding the receiver arms 46 to position the tire concentrically on the lower rim 60 which is set in the post-inflator 2. This can be easily realized, for example, by a combined use of detecting members 71 and 72 similar to limit switches which are located at the advanced and receded positions of the receiver arms 46 as shown in FIG. 3. Consequently, upon elevating operation, the lower rim 60 can be appropriately engaged with the lower bead of the cured tire T without rim biting as shown in FIGS. 11C and 11D. As soon as the tire T is transferred to and set on the post-inflator 2 in this manner, the receiver arms 46 are moved forward again for return to the initial positions shown in FIGS. 1 and 3.

As is clear from the foregoing description, the present invention employs horizontally reciprocable ejector and receiver arms 8 and 46 to transfer and hand over a cured tire horizontally in a dead state, in contrast to the conventional transfer mechanisms using a combination of an unloader and a roller conveyor, so that the tire can be transferred stably and securely transferred without the possibilities of deforming or distorting the tire or varying its position or posture. Namely, the cured tires can be transferred without damage and correctly set in position. A change in the tire size requires only the adjustment of the ejector and receiver arms 8a, 8b, 46a and 46b. Since free movement of the tire is restricted in the entire path of transfer, it is possible to preclude misalignment of the tire which would lead to the rim biting problems or other defects of the product, simply by appropriate control of the ejector and receiver arms 8 and 46. In addition, the arms 8 and 46 involve very simple linear movements alone throughout the transfer operation, so that the transfer mechanism itself can be simplified to a significant degree. The roller conveyer 62 is used only for discharging the tires from the post-inflator after inflation treatment. Simplification of the transfer mechanism as a whole can drastically eliminate the problems of the conventional transfer mechanisms.

Obviously, numerous modifications and variations of the present invention are possible in light of the above teachings. It is therefore to be understood that within the scope of the appended claims, the invention may be practiced otherwise than as specifically described herein.

What is claimed is:

1. A mechanism for transferring cured tires from a tire press to a post-inflator, comprising:
   a plurality of ejector arms located between said tire press and post-inflator;
   means for moving said ejector arms horizontally toward and away from said tire press and vertically up and down in a receded position outside said tire press;
   a plurality of receiver arms supported on said post-inflator; and means for moving said receiver arms horizontally back and forth in parallel relationship with and at a level vertically spaced from said ejector arms, said receiver arms being spaced from each other by a predetermined distance to permit said ejector arms and a lower rim of said post-inflator to pass vertically therethrough wherein said means for moving said receiver arms is mounted on said post-inflator.

2. A mechanism as set forth in claim 1, wherein said means for moving said ejector arms further comprises a bracket and hydraulic means for moving said bracket.

3. A mechanism as set forth in claim 1, wherein said means for moving said receiver arms comprises a block member to which said receiver arms are mounted and hydraulic means mounted on said post-inflator for horizontally moving said block member.

4. A mechanism as set forth in claim 1, wherein said means for moving said ejector arms further comprises a bracket and hydraulic means for moving said bracket and wherein said means for moving said receiver arms comprises a block member to which said receiver arms are mounted and hydraulic means mounted on said post-inflator for horizontally moving said block member.

* * * * *